H. SHERWOOD.
Separating Vegetable Matter from Animal Fibres.
No. 70,754. Patented Nov. 12, 1867.
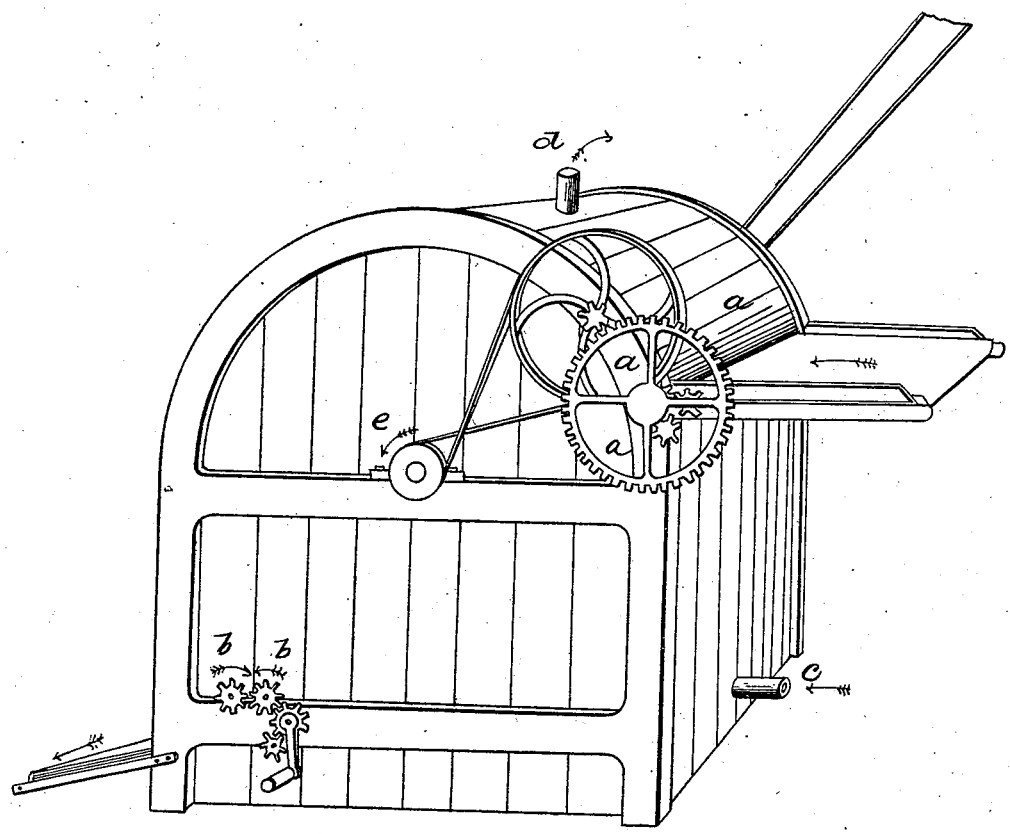
Witnesses
G. F. Warren
Jn. Dean
Both of No. 17 Gracechurch Street London EC
Inventor
Henry Sherwood

United States Patent Office.

HENRY SHERWOOD, OF LONDON, GREAT BRITAIN.

Letters Patent No. 70,754, dated November 12, 1867; patented in Belgium, January 25, 1866.

---

IMPROVED MODE OF SEPARATING VEGETABLE MATTER FROM ANIMAL FIBRES.

---

The Schedule referred to in these Letters Patent and making part of the same.

---

TO ALL WHOM IT MAY CONCERN:

Be it known that I, HENRY SHERWOOD, of 4 Albion Villas, Hammersmith, London, W., in the county of Middlesex, in the Kingdom of Great Britain, have invented a new and improved Mode of Ridding Animal Fibrous Substances of Vegetable Fibres or Matter with which they may be mixed, without injuring or in any way altering the animal fibres, and without further destroying the vegetable fibres than disaggregating them, which when removed are utilizable as paper-pulp; and I do hereby declare that the following is a full and exact description thereof.

Now, heretofore, rags composed of wool, with cotton or linen sewing, have been prepared for tearing into fibres for remanufacturing by cutting off the sewing, causing thereby a large loss of adhering wool, and still leaving some unperceived vegetable fibres in the rags, which fibres cause damage to the cloths manufactured therefrom, and expense, by having to burl them out by hand labor; and further, rags composed of wool woven along with cotton or linen as warp or weft, have been prepared by disintegrating (or converting into a modified dextrin) the vegetable part, by means of their immersion in an aqueous solution of acids or other salts. Also such solutions in a vaporized state, (and in particular hydrochloric acid of commerce,) have been attempted and claimed to be used; but always with the presence of aqueous vapor arising from the water of the aqueous solution or acid, and in some cases, besides, from the rags operated upon having been first intentionally moistened. All which modes cause the dye to be discharged, the scales of wool to be eaten away, and its structure to be partly broken up and charred, consequently its color and felting property are destroyed, and its strength, length, and softness are impaired. Lastly, wool mixed with seeds, known as "burry wool," and "mestizo wool" has been treated as last mentioned, with like effects, or the vegetable matter has been partially removed by machinery, with considerable loss of wool fibre.

After many years' research I have discovered that when the acids or other salts above mentioned act upon vegetable fibres so as to reduce them to a pulverulent state, it is the presence of the elements of water which is the influencing cause of the destruction of the color, strength, softness, and felting property of animal fibres, and likewise of the conversion of the vegetable fibres into a modified dextrin. And further, I have discovered that the anhydrides, which are salts of the acid radicles, (which do not become acid until after they are brought into union with the elements of water,) and that the anhydrous hydracids, all exert no influence on the natural or dyed color, strength, softness, or felting property of animal fibres, and that when vegetable fibres are disaggregated by exposure to these means, the change of strength which they undergo is not a permanent change, but they may be regenerated to nearly their pristine strength, and are utilizable as a short paper-pulp. I therefore make use of the most convenient of these agents, which are sulphuric anhydride, and anhydrous chlorohydric gas as agents by which I effect the disaggregation of vegetable fibres, which means do totally obviate the disadvantageous results, which have been pointed out, of the present mode of treating these mixed substances. In the use of these means my invention consists.

To enable others skilled in the art to make use of my invention, I will now proceed to describe my mode of operation.

I produce sulphuric anhydride by distillation of the sulphates by known modes, or by oxidation of sulphurous acid in contact with nitric peroxide, as in the manufacture of sulphuric acid. I employ it in a gaseous state, at a temperature of from 50° centigrade, (below which heat it has become gaseous,) to 80°, which is the extreme of heat to which wool ought to be subjected. Its action is in nowise impaired if, to suit convenience in economically preparing it, it be mixed with nitric oxide or with nitrogen. In producing anhydrous chlorohydric gas, (which I employ at about the same heat,) I prepare it either from the chlorides by well-known means, or, which I find more convenient and more easily enabling its supply to be regulated, by passing vapor of aqueous hydrochloric acid through burning coke or charcoal, when the oxygen of the water is taken into combination with the carbon of the fuel, and forms carbonic acid, which, with the liberated hydrogen of the water, passes over with the now anhydrous chlorohydric gas, and which gases are not detrimental to its action for this use. I pass the substances to be operated upon through an atmosphere of one or more of these gases, exposing them to it during one minute or more, according to the substances.

This operation I effect by the following means: I take an ordinary willow, such as is used for shaking the dust out of rags, and having made it air-tight, and having glazed or varnished the interior, I add a pair of air-tight rollers, *a*, on its top, the width of the machine, between which I introduce the substances in a dry state to the interior of the machine, of which the swift *e* is in continual motion. I also add a similar pair of rollers, *b*, at the bottom of the machine, through which the substances are made to pass out of it after remaining the required time in the machine. These rollers may revolve by hand, or may be thrown into gear when required, so as to turn by the machine itself. I fill the cavity of the machine by a pipe inserted in any convenient part *c*, and I provide an outlet pipe at some other part, *d*. When the substances are introduced by the rollers *a*, they are seized and dashed round by the swift *e* in the atmosphere of the heated gases, when their vegetable part becomes disaggregated, and capable of being removed in the state of powder, by means now commonly employed for that purpose. I can substitute for this machine, (which in nowise needs to differ from an ordinary shake-willow, except in making it air-tight to prevent escape of gases by substituting ingress and egress-rollers instead of the door,) any air-tight box (similarly provided with ingress and egress-rollers and ingress and egress pipes,) in which the substances may simply pass from the ingress-rollers to the egress-rollers, either on rollers or on an endless sheet, or down an inclined plane; the only object of the machine being to expose the substances to the action of the gases, and to prevent the escape of the gases into the atmosphere around.

After the disaggregated vegetable fibres have been removed, I place the animal fibres in water to solve away any adhering gases, which by after exposure to moist atmosphere would injuriously affect the fibres. This operation is rendered more certain by the addition of an alkali to the water, though not necessary to the operation. When it is undesirable to wet the animal fibres, I dash them a few moments in a willow filled with steam and ammonia vapor, which absorb or neutralize any adhering gases.

I prepare the disaggregated vegetable fibres into paper-pulp by immersing them alternately in a heated solution of a hyposulphite, or of a sulphite of soda or of potash, and a hypochlorite of lime, or of alumina, or of soda. I repeat and prolong the immersions as much as is necessary to regenerate their strength and to bleach them. For this purpose I make use of closed cisterns in which I treat the fibres at a heat under $100°$ centigrade, for heat is hurtful to them, but under pressure of air or of liquid to a convenient degree, for pressure is beneficial to the action of agents on fibres.

I will now ascertain and define what is new, and what I claim as my invention in the means and apparatus hereinbefore described, which I desire to secure by Letters Patent:

1. I claim to disaggregate vegetable fibres or substances by means of their exposure to gaseous sulphuric anhydride and to anhydrous chlorohydric gas, each used alone or together, or in mixture with other gases not being the elements of water, but I do not claim the use of vapors produced by evaporating the sulphuric or muriatic acids of commerce, except the oxygen of the aqueous particles contained in those vapors be first eliminated, or caused to enter into chemical combination with some other element to form an oxide.

2. I claim, in an instrument necessary for making use of gaseous agents, the combination of air-tight rollers *a* and *b*, to receive substances into a cavity filled with an atmosphere of gases, and to deliver them from it, with any known mechanical arrangement applicable to receiving the substances from the ingress-rollers and delivering them to the egress-rollers, (one of such arrangements being given as an example, *e*,) acting substantially, and capable of modification, as described.

3. I claim to prepare vegetable fibres for paper-making and other uses, by submitting them to the action of known agents in closed cisterns containing liquids at a low heat, (under $100°$ centigrade,) but under pressure of air or of liquids.

In witness whereof I, the said HENRY SHERWOOD, have hereunto set my hand this twelfth day of February, in the year of our Lord one thousand eight hundred and sixty-seven.

HENRY SHERWOOD.

Witnesses:
  G. F. WARREN,
  JOHN DEAN, } *Both of No. 17 Gracechurch Street, London, England.*